United States Patent [19]
Oshima

[11] Patent Number: 4,508,575
[45] Date of Patent: Apr. 2, 1985

[54] PROCESS FOR PRODUCING IVORYLIKE MATERIAL FOR KEYS OF MUSICAL INSTRUMENTS

[75] Inventor: Yutaka Oshima, Shizuoka, Japan

[73] Assignee: Nippon Gakki Seizo Kabushiki Kaisha, Japan

[21] Appl. No.: 533,879

[22] Filed: Sep. 20, 1983

[30] Foreign Application Priority Data

Sep. 20, 1982 [JP] Japan .................. 57-163544

[51] Int. Cl.³ .............................................. C08L 89/00
[52] U.S. Cl. ...................................... 106/148; 264/73; 264/77; 264/246; 264/247
[58] Field of Search .................. 264/73, 77, 246, 247; 260/119; 106/148

[56] References Cited

U.S. PATENT DOCUMENTS

| | | |
|---|---|---|
| 300,158 | 6/1884 | Stevens .................. 264/73 |
| 444,775 | 1/1891 | DePont .................. 106/137 |
| 1,320,666 | 11/1919 | Bartels .................. 260/119 |
| 1,730,673 | 10/1929 | Mell .................. 264/175 |
| 1,758,500 | 5/1930 | Christmas .................. 106/140 |
| 2,045,471 | 6/1936 | Kasen .................. 260/119 |
| 3,350,483 | 10/1967 | Erb et al. .................. 264/77 |
| 4,447,268 | 5/1984 | Oshima .................. 106/148 |

*Primary Examiner*—Theodore Morris
*Attorney, Agent, or Firm*—Lerner, David, Littenberg, Krumholz & Mentlik

[57] ABSTRACT

In production of artificial material for keys of musical instruments from two or more sorts of casein compositions of different colors, an oriented sheet including linear bodies made of at least one sort of casein composition and arranged in a given orientation is subjected to heat pressing followed by folmalin hardening in order to develop flowing deep stripes and massy impression on the product very close to natural ivory.

28 Claims, 15 Drawing Figures

PROCESS FOR PRODUCING IVORYLIKE MATERIAL FOR KEYS OF MUSICAL INSTRUMENTS

BACKGROUND OF THE INVENTION

The present invention relates to improved process for producing ivorylike material for keys of musical instruments, and more particularly relates to improvement in production of artificial material for musical instruments having appearance and properties very close to those of natural ivory.

Ivory has long been highly appreciated by ones skilled in the art of keyboard musical instruments such as pianos, organs and accordians as a material for composing at least surface parts of keys. Such a lean towards ivory is believed to be caused by, aside from the fact that ivory is mainly used for high class art objects, its ideal properties which well suffice all of the following complicated requirements for the material to be used for keys of musical instruments of the above-described sort.

(a) The material should have moderate moisture absorbability so that a key should well absorb sweat on the fingers of players in order to prevent undesirable finger slippage on the key during performance.

(b) The material should have moderate surface smoothness with moderate frictional resistance since these factors have subtle influences on key touch.

(c) The material should have excellent appearance, i.e. high whiteness accompanied with high contamination resistance.

(d) The material should have moderate hardness which assures better key touch and less frictional abrasion over a long period.

(e) The material should have moderate workability for easy shaping into keys.

Despite such ideal properties, use of ivory for keys has a serious disadvantage of poor supply which falls short of increasing demand in production of keyboard musical instruments.

As a substitute, use of synthetic resins have been increasingly employed for years in production of keys for musical instruments since they are suited for mass-production which assures constant and sufficient supply. Synthetic resin keys, however, still have several drawbacks despite their relatively beautiful appearance and flexible workability. First, excessive smooothness of synthetic resins often causes undesirable finger slippage on keys during performance. This trouble is further amplified by poor moisture absorbability of synthetic resins which disenalbes effective absorption of sweat on fingers. Further, synthetic resins in general have relatively low hardness which may allow quick frictional abrasion of keys.

In an attempt to avoid the above-described drawbacks of synthetic resins when used for keys of musical instruments, the inventor of the present invention already proposed a new process in U.S. patent application Ser. No. 501,968 now U.S. Pat. No. 4,447,268 (a continuation of the parent application Ser. No. 296,483 filed in 1981 now abandoned). In the case of this proposed method, either hydrated or non-hydrated inorganic filler is used in combination with casein. More specifically, casein is mixed and kneaded with filler and water and, after shaping the mixture into a block, the block is impregnated with formalin for hardening. This proposed process well develops high moisture absorbability and good affinity to human skin of casein plastics, a natural protein. Further addition of the inorganic filler greatly improves hardness, thermal conductivity and massive impression of the product, which is believed to have by far exellent properties than the conventional keys made of synthetic resins.

When compared with keys made of natural ivory, however, keys made of the casein plastics are still inferior in appearance and cannot avoid to give a different impression. This is due to the fact that mere mixing and kneading of casein with filler cannot develop deep and flowing stripes on the surface of the product which are special to natural ivory.

It is also proposed to develop varicoloured patterns on the surface of a product by extruding a mixture of caseins of different colours on a multi-cylinder type extruder. This process, however, is again unable to develop subtle, flowing stripes on the surface of the product which are in general possessed by natural ivory.

SUMMARY OF THE INVENTION

It is the object of the present invention to produce ivory-like synthetic material for keys of musical instruments which has subtle, deep, flowing stripes on the surface and gives an impression very close to that of natural ivory.

In accordance with the basic concept of the present invention, two or more sorts of casein compositions of different colours are used in combination, at least one sort of casein composition is formed into linear bodies such as strings, ropes, stripes or bands, an oriented sheet is formed including such linear bodies, and the oriented sheet is impregnated with folmalin for hardening after application of heat pressing substantially in its thickness direction. Each casein composition is prepared by mixing and kneading casein of a colour with filler and water.

In one aspect of the present invention, at least one sort of casein composition is formed into a sheet body and the linear bodies are laid on this sheet body in an appropriate orientation in order to form the above-described oriented sheet.

In another aspect of the present invention, all sorts of casein compositions are formed into linear bodies, and linear bodies of different colours are laid one over another alternately in an appropriate orientation in order to form the above-described oriented sheet.

DESCRIPTION OF THE PREFERRED EMBODIMENTS

Figure 1:
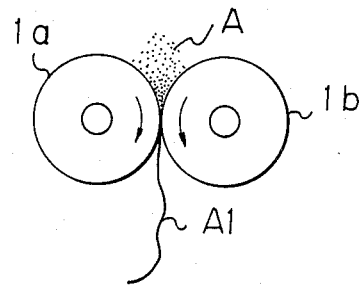
FIG. 1 is a side view of an arrangement for forming a sheet body in accordance with one embodiment of the present invention.

The process of the present invention starts with preparation of two or more sorts of casein compositions of different colours. That is, each casein composition is prepared by mixing and kneading casein with filler, one or more colouring agents and water.

Rennet casein fine powders of 100 meshes or lower is advantgeously used for the mixing.

Though any sorts of fillers are basically usable, hydrated and non-hydrated inorganic fillers are most advantageously used for production of excellent ivorylike material for keys. The hydrated inorganic fillers are chosen from a group consisting of aluminum hydroxide, or aluminum hydrate, hydrated calcium sulfate, hydrated calcium silicate, calcium hydroxide, magnesium hydroxide, basic magnesium carbonate, hydrated aluminium silicate, magnesium silicate and hydrated silicic acid. The non-hydrated inorganic fillers are chosen from a group consisting of silicon oxide, calcium phosphate, alumina, calcium carbonate, barium carbonate, calcium sulfate, magnesium oxide and titanium oxide.

Preferable content ratio of the fillers is in a range from 10 to 200 parts by weight, more preferably from 25 to 85 parts by weight, per 100 parts by weight of casein.

For adjustment in colour tone of the product, colouring agents such as pigments (titanium oxide, zinc white) and acid dyes are added up to 10 parts by weight, more preferably from 1 to 5 parts by weight, per 100 parts by weight of casein.

The above-described ingredients are mixed and kneaded with water whose content ratio is in a range from 20 to 80 parts by weight, more preferably from 20 to 50 parts by weight, per 100 parts by weight of casein. After the kneading, the mixture is left for 5 to 24 hours at about the room temperature for swelling of casein for the purpose of better shaping.

Two or more sorts of casein compositions of different colours are prepared in the above-described manner. Difference in colour tone between the casein compositions is adjusted by changing content ratios of the fillers and colouring agents used for their preparation. However, too large difference in content ratio of fillers between the casein compositions tends to develop local variation in extent of dimensional change on the product after hardening, which may cause development of cracks and/or separation at borders between the casein compositions contained in the product. In order to avoid such troubles, the difference in content ratio of fillers including colouring agent should preferably be 10 parts by weight or smaller per 100 parts by weight of casein. Ideal difference in colour tone is preferably resulted from 0.1 to 2 parts by weight of difference in content ratio of colouring agents.

In accordance with the first embodiment of the present invention, at least one casein composition is formed into linear bodies such as strings, ropes, strips or bands, at least one sort of casein composition is formed into a sheet body, and the linear bodies are laid on the sheet body in an appropriate orientation in order to form an oriented sheet. For simplification, it is now assumed that an oriented sheet is made of two sorts of casein compositions of different colours.

First, one of the two sorts of casein compositions is formed into a sheet body. One example of the arrangement for forming such a sheet body is shown in FIG. 1, in which the one casein composition A is supplied to a nip formed by a pair of mixing rollers 1a and 1b in order to form a sheet body A1. The thickness of the sheet body A1 varies depending on that required for the product, and is usually in a range from 1.5 to 2.5 mm. Formation of the sheet body A1 is usually carried out at a temperature from 20° to 30° C.

Next, the other of the two sorts of casein compositions is formed into linear bodies whose diameter is preferably in a range from 0.5 to 1.0 mm. Such linear bodies are prepared by, for example, extruding the above-described casein composition from an ejection nozzle.

Figure 2:
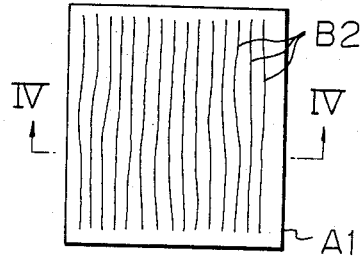
FIGS. 2 and 3 are plan views of examples of the oriented sheet
Figure 3:
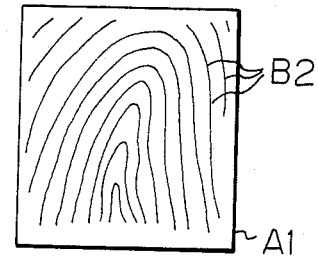
Figure 4:
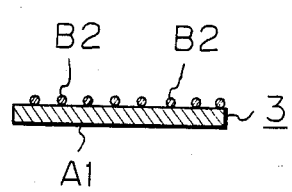
FIG. 4 is a section taken along a line IV—IV in FIG. 2.

The linear bodies B2 so prepared are then laid on the sheet body A1 in an appropriate orientation such as shown in FIG. 2 or 3 in order to form an oriented sheet 3. In either orientation, the interval between adjacent linear bodies B2 should preferably be in a range from 1 to 3 times as large as the diameter of each linear body B2. One example of the transversal section of the oriented sheet 3 so obtained is shown in FIG. 4.

Figure 5:
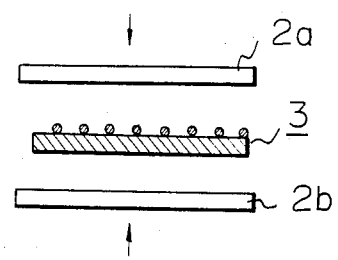
FIG. 5 is a sectional view of an arrangement for heat pressing taken in the same direction as FIG. 4.
Figure 6:
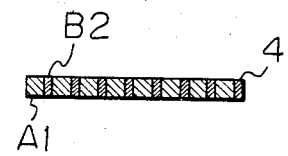
FIG. 6 is a sectional view of the oriented sheet after heat pressing

The oriented sheet 3 so prepared is then subjected to heat pressing. One example of the arrangement for heat pressing is shown in FIG. 5, in which the oriented sheet 3 is pressed in the thickness direction by a pair of heat plates 2a and 2b so that the linear bodies B2 should be pressed into the sheet body A1 in order to form a heat-pressed oriented sheet 4 such as shown in FIG. 6. In appearance, this heat-pressed oriented sheet 4 has lots of deep and flowing stripes giving an impression very close to that of natural ivory. The heat pressing is carried out preferably at a temperature from 80° to 95° C., under a pressure from 100 to 150 kg/cm² and for a period from 15 to 30 minutes.

During this heat pressing, the linear bodies B2 should preferably be pressed into the sheet body A1 without significant dispersion. To this end, at least at heat pressing, the fluidity of the casein composition forming the sheet body A1 should preferably be larger than that of the casein composition forming the linear bodies B2. In order to suffice this requirement, it is advisable to employ at least one of the following expedients.

(a) Moisture content of the casein composition forming the sheet body A1 should be made larger than that of the casein composition forming the linear bodies B2. Difference in moisture content should preferably be 20 parts by weight or larger, or more preferably 30 parts by weight or larger, per 100 parts by weight of casein. Such difference in moisture content brings about stronger bond between the casein compositions in the product too.

(b) Temperatures of the heat plates used for the heat pressing should be made different from each other. For example in the arrangement shown in FIG. 5, the heat plate 2a arranged for contact with the linear bodies B2 is kept at a temperature from 80° to 85° C. whereas the heat plate 2b arranged for contact with the sheet body A1 is kept at a temperature from 90° to 95° C. That is, the heating temperature for the sheet body A1 should preferably kept from 5° to 10° C. higher than that for the linear bodies B2 for easier plasticization of the sheet body A1.

(c) Contact of the heat plate 2b with the sheet body A1 should be made 3 to 5 minutes earlier than contact of the heat plate 2a with the linear bodies B2 for advanced plasticization of the sheet body A1.

The above-described difference in fluidity can also be obtained by adjustment of context ratio of the fillers in the casein compositions. However, as remarked above, too significant difference in content ratio of fillers would develop local variation in extent of dimensional change on the product and should be avoided. Among the above-described three expedients, the first one is most effective.

The heat-pressed oriented sheet is then subjected to folmalin treatment for hardening. Preferably, the heat pressed oriented sheet is in advance dried in hot air of 50° to 80° C. in order to lower the moisture content below 5% by weight. Too high moisture content of the heat-pressed oriented sheet before formalin treatment would impair dimensional stability of the product after hardening in a highly humid environment. This advanced moisture content lowering is in particular necessary in the case of the above-described first expedient in which different casein compositions have different moisture contents.

After this advanced moisture content lowering, the heat-pressed oriented body is put into a bath of folmalin of 3 to 10% by weight concentration at the room temperature. Impregnation time varies depending on the size of the heat-pressed oriented sheet. It is, for example, 6 days for 3 mm. thickness, 16 days for 5 mm. thickness and 50 days for 10 mm. thickness.

After the hardening with folmalin, the crude material is dried to lower its moisture content to about 10%, and further dried at 20° to 45° C. for 2 to 5 days until its moisture content dwindles down to 4 to 6%. When any deformation is observed, the crude material is put in hot water bath for several minutes, heat pressed at a low pressure for removal of the deformation and subjected to drying at 30° to 40° C. under humidity control to lower the moisture content finally to 3 to 4%. When required, cutting, machining and/or polishing is applied in order to obtain the ivorylike material of the present invention.

In accordance with the second embodiment of the present invention, all sorts of casein compositions are formed into linear bodies such as strings, ropes, strips or bands, and the linear bodies of different colours are laid one over another alternately in an appropriate orientation in order to form an oriented sheet. Like the first embodiment, it is now assumed for simplification that an oriented sheet is made of two sorts of casein compositions of different colours. In this case, however, it is not required here that they should be different in fluidity. As in the first embodiment, the linear bodies may be prepared by extrusion from an ejection nozzle. More conveniently, however, the oriented sheet may be prepared by the known two colour concurrent extrusion.

Figure 7:
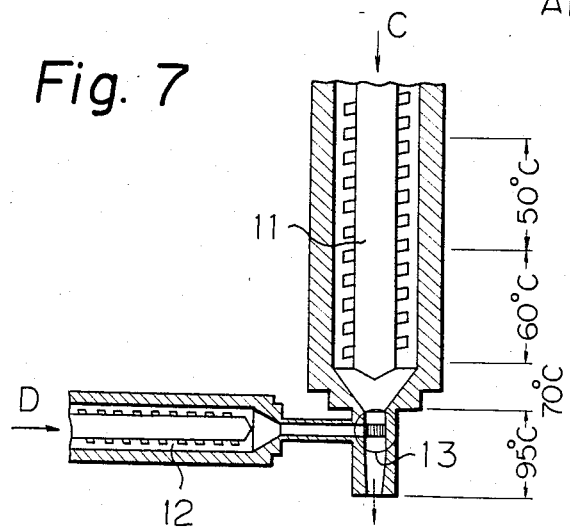
FIG. 7 is a sectional view of an arrangement for forming an oriented sheet in accordance with the other embodiment of the present invention.
Figure 8:
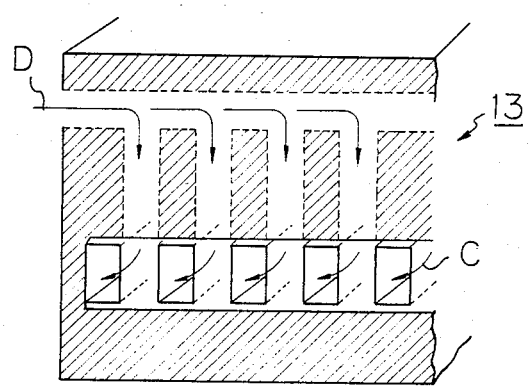
FIG. 8 is a perspective view, partly in section, of the die for the extruder used in the arrangement shown in FIG. 7, FIGS. 9 and 10 are plan and sectional views of one example of the oriented sheet formed on the arrangement shown in FIG. 7.
Figure 9:
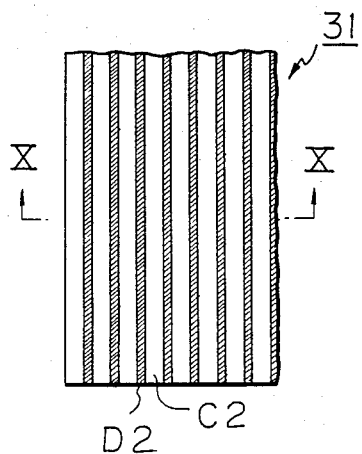
Figure 10:
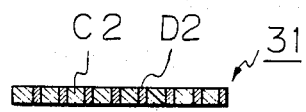

One example of the arrangement for such extrusion is shown in FIG. 7, in which two extruders 11 and 12 are used in combination with their axes in normal to each other. More specifically, the first casein composition C is supplied to the first extruder 11 and the second casein composition D is supplied to the second extruder 12. Temperature distribution along the axis of the first extruder 11 is shown in the drawing. The two extruders 11 and 12 are joined together near their outlets and a die 13 shown in FIG. 8 is arranged at the junction, and the casein compositions C and D flow through the die 13 for extrusion as indicated by arrows in order to form an oriented sheet 31 such as shown in FIGS. 9 and 10. In this oriented sheet 31, the first linear bodies C2 and the second linear bodies D2 are arranged alternately and the thickness of the oriented sheet 31 is, for example, in a range from 1 to 2 mm.

Figure 11:
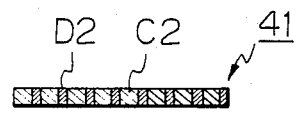
FIG. 11 is a sectional view of the oriented sheet shown in FIGS. 9 and 10 after heat pressing.

By subjecting the oriented sheet 31 to heat pressing on an arrangement such as shown in FIG. 5, a heat-pressed oriented sheet 41 such as shown in FIG. 11 is obtained which is provided with flowing deep stripes formed by the alternately arranged first and second linear bodies C2 and D2.

Figure 12:
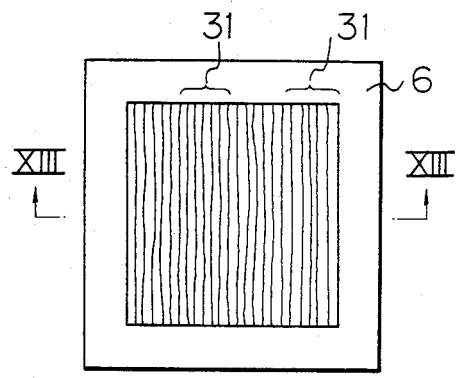
FIG. 12 is a plan view for showing another example of heat pressing.
Figure 13:
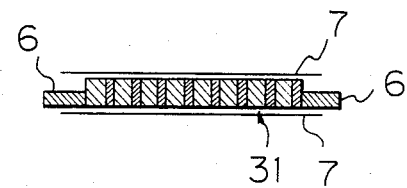
FIG. 13 is a section taken along a line XIII—XIII in FIG. 12.
Figure 14:
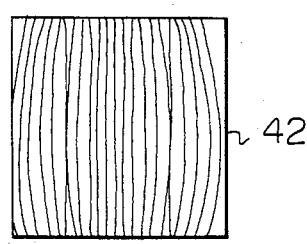
FIG. 14 is a plan view of a heat-pressed oriented sheet formed by the process shown in FIGS. 12 and 13.

Another example of heat pressing is shown in FIGS. 12 and 13. In this case, two or more oriented sheet 31 such as shown in FIGS. 9 and 10 are arranged side by side and the collected oriented sheets 31 are surrounded by a solid frame 6 which is somewhat thinner than the oriented sheets 31. Next the whole is sandwiched between a pair of sheets 7, which are made of an easily releasable material such as polyester, and subjected to heat pressing. In this case, the oriented sheets 31 are well pressed to form a heat-pressed oriented sheet 42 shown in FIG. 14 which has flowing deep stripes at borders between the first and second linear bodies C2 and D2. Flow of casein compositions takes place significantly near the surfaces of the oriented sheets 31. In particular at sections near the solid frame 6 shown in FIG. 12, stripes tend to disappear due to too significant flow of casein compositions. However, this does not matter at all since inside stripes appear on the surface of the product after polishing usually employed in production of keys.

Figure 15:
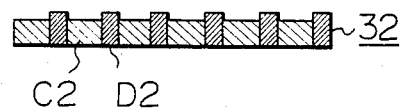
FIG. 15 is a sectional view of another example of the oriented sheet formed on the arrangement shown in FIG. 7.

In extrusion of the oriented sheet 31 on the arrangement shown in FIG. 7, proper choice of the die 13 enables formation of an oriented sheet such as shown in FIG. 15. In this case, the second linear bodies D2 are thicker than the first linear bodies C2 by 10 to 20% and project like crests on the surface of the oriented sheet 32. The projecting linear bodies D2 are crushed and spreaded on the surface of the oriented sheet 32 during heat pressing, and effectively develop flowing deep stripes on the surface of the product. This has an effect intermediate between the first and second embodiments of the present invention. For control of fluidization of the projecting linear bodies during heat pressing, one of the above-described three expedients for fluidity defference adjustment may be conveniently employed.

Like the first embodiment, hardening of the heat-pressed oriented sheet is carried out by impregnation with folmalin.

The ivorylike material produced in accordance with the present invention may be shaped either solely into keys or into surface covering of keys in combination with wooden bases.

The ivorylike material produced in accordance with the present invention is provided with flowing deep stripes and gives massy impression, both being very close to those of natural ivory.

I claim:

1. A process for producing ivorylike material for keys for musical instruments, comprising the steps of providing a first casein composition of a first color comprising a filler, coloring agent and water; providing a second casein composition having a second color different from the first color, said second casein composition comprising filler, coloring agent and water and being in the form of a sheet; extruding said first casein composition through a dye to form thin linear bodies on said sheet arranged in a predetermined orientation so as to simulate the surface of ivory; and heat pressing said oriented sheet so as to form a heat pressed oriented sheet; and impregnating said heat pressed oriented sheet with formalin for hardening.

2. A process according to claim 1, wherein said casein compositions are prepared by mixing and kneading casein with filler, coloring agent and water.

3. Improved process as claimed in claim 1 in which said filler is non-hydrated inorganic filler chosen from a group consisting of silica oxide, calcium phosphate, alumina, calcium carbonate, barium carbonate, calcium sulfate, magnesium oxide and titanium oxide.

4. Improved process as claimed in claim 1 in which mixing ratio of said filler is 10 to 200 parts by weight per 100 parts by weight of said casein.

5. Improved process as claimed in claim 4 in which mixing ratio of said filler is 25 to 85 parts by weight per 100 parts by weight of said casein.

6. Improved process as claimed in claim 1 in which mixing ratio of said colouring agent is 10 parts by weight or less per 100 parts by weight of said casein.

7. Improved process as claimed in claim 6 in which mixing ratio of said colouring agent is 1 to 5 parts by weight per 100 parts by weight of said casein.

8. Improved process as claimed in claim 1 in which mixing ratio of said water is 20 to 80 parts by weight per 100 parts by weight of said casein.

9. Improved process as claimed in claim 2 in which each said casein composition is left for 5 to 24 hours at the room temperature after said mixing and kneading.

10. Improved process as claimed in claim 1 in which difference in content ratio of said filler and colouring agent between said casein compositions is 10 parts by weight or less per 100 parts by weight of said casein.

11. Improved process as claimed in claim 10 in which difference in content ratio of said colouring agent between said casein compositions is 0.1 to 2 parts by weight per 100 parts by weight of said casein.

12. Improved process as claimed in claim 1 in which said heat pressing is carried out at a temperature of 80° to 95° C., under a pressure of 100 to 150 kg/cm$^2$ and for a period of 15 to 30 minutes.

13. Improved process as claimed in claim 1 in which moisture content of said heat-pressed oriented sheet is made less than 5% before impregnation with folmalin.

14. Improved process as claimed in claim 1 in which said heat-pressed oriented sheet is immersed in a folmalin bath of 3 to 10% concentration at the room temperature for impregnation with folmalin.

15. Improved process as claimed in claim 1 in which said filler is hydrated inorganic filler chosen from a group consisting of aluminum hydroxide or alumina hydrate, calcium sulfate hydrate, hydrated calcium silicate, calcium hydroxide, magnesium hydroxide, basic magnesium carbonate, hydrated aluminium silicate, magnesium silicate and hydrated silic acid.

16. Improved process as claimed in claim 1 in which the thickness of said sheet body is 1.5 to 2.5 mm.

17. Improved process as claimed in claim 1 in which the largest cross sectional size of each said linear body is 0.5 to 1.0 mm.

18. Improved process as claimed in claim 16 in which the distance between adjacent linear bodies on said orientated sheet is 1 to 3 times as large as said largest cross sectional size.

19. Improved process as claimed in claim 1 in which said sheet body is made of a first casein composition having fluidity larger than that of a second casein composition used for said linear bodies.

20. Improved process as claimed in claim 19 in which the moisture content of said first casein in larger than that of said second casein composition.

21. Improved process as claimed in claim 20 in which difference in moisture content between said casein compositions is 20 parts by weight or more per 100 parts by weight of said casein.

22. Improved process as claimed in claim 20 in which said linear bodies are heat pressed at a temperature higher than that for said sheet body.

23. Improved process as claimed in claim 22 in which difference in temperature at heat pressing is 5° to 10° C.

24. Improved process as claimed in claim 20 in which heat pressing of said sheet body is initiated earlier than that of said linear bodies.

25. Improved process as claimed in claim 24 in which heat pressing of said sheet body is initiated 3 to 5 minutes earlier than that of said linear bodies.

26. A process for producing ivorylike material for keys of musical instrument, said process comprising the steps of preparing two or more casein compositions of different colors, each composition being prepared by mixing and kneading casein with filler, coloring agent and water; forming an oriented sheet including thin linear bodies of said casein compositions in alternate, side by side, bonded arrangement by concurrently extruding said casein compositions through a common die; heat pressing said oriented sheet substantially in its thickness direction to form a heat-pressed oriented sheet; and impregnating said heat-pressed oriented sheet with folmalin for hardening.

27. Improved process as claimed in claim 13 in which linear bodies made of at least one sort of casein composition are sized so that they should project on the surface of said oriented sheet.

28. Improved process as claimed in claim 13 in which two or more of said oriented sheets are arranged side by side, surrounded by a solid frame thinner than said oriented sheets, sandwiched by a pair of easily releasable sheets, and subjected to heat pressing.

* * * * *